US00RE41378E

(19) United States
(12) Reissued Patent
Mishima et al.

(10) Patent Number: US RE41,378 E
(45) Date of Reissued Patent: Jun. 15, 2010

(54) LIQUID CRYSTAL DISPLAY DEVICE

(75) Inventors: Yasuyuki Mishima, Mobara (JP); Shunsuke Morishita, Mobari (JP)

(73) Assignee: Hitachi, Ltd., Tokyo (JP)

(21) Appl. No.: 12/185,317

(22) Filed: Aug. 4, 2008

Related U.S. Patent Documents

Reissue of:
(64) Patent No.: 6,583,844
Issued: Jun. 24, 2003
Appl. No.: 09/452,462
Filed: Dec. 2, 1999

U.S. Applications:
(63) Continuation of application No. 11/165,554, filed on Jun. 24, 2005.

(30) Foreign Application Priority Data

Dec. 2, 1998 (JP) ..... 10-342916

(51) Int. Cl.
*G02F 1/1345* (2006.01)
*G09G 3/36* (2006.01)
*G09G 5/00* (2006.01)

(52) U.S. Cl. ..... 349/149; 349/150; 349/151; 349/152; 345/87; 345/98; 345/103; 345/104; 345/204

(58) Field of Classification Search ..... 345/87–104, 345/204–215, 690–699; 349/123–141, 149–152
See application file for complete search history.

(56) References Cited

U.S. PATENT DOCUMENTS

| | | | | |
|---|---|---|---|---|
| 4,904,895 | A | 2/1990 | Tsukamoto et al. | 313/336 |
| 5,592,199 | A | 1/1997 | Kawaguchi et al. | |
| 5,608,559 | A | 3/1997 | Inada et al. | |
| 5,737,053 | A | 4/1998 | Yomogihara et al. | |
| 5,739,887 | A | 4/1998 | Ueda et al. | |
| 5,956,001 | A | 9/1999 | Sumida | |
| 6,061,246 | A | 5/2000 | Oh et al. | |
| 6,081,305 | A | 6/2000 | Sato | |
| 6,100,947 | A | 8/2000 | Katayama | |
| 6,266,119 | B1 | 7/2001 | Takahashi et al. | |
| 6,407,795 | B1 | 6/2002 | Kamizono et al. | |
| 6,583,844 | B1 * | 6/2003 | Mishima et al. | 349/149 |

* cited by examiner

*Primary Examiner*—Vijay Shankar
(74) *Attorney, Agent, or Firm*—Antonelli, Terry, Stout & Kraus, LLP

(57) ABSTRACT

In spite of an increase in the size of a liquid crystal display panel, it is possible to prevent the defective connection of a flexible wiring board to a transparent substrate of the liquid crystal display panel. A liquid crystal display device includes a pair of transparent substrates arranged to oppose each other across a liquid crystal, for which they are utilized to form a chamber, a plurality of pixels formed along a spreading direction of the liquid crystal, driving circuits for supplying video signals to the pixels, and a flexible wiring board for supplying signals to the input sides of the driving circuits from a substrate on which a control circuit is mounted, the flexible wiring board being divided into a plurality of portions.

16 Claims, 10 Drawing Sheets

LIQUID CRYSTAL DISPLAY DEVICE

Matter enclosed in heavy brackets [ ] appears in the original patent but forms no part of this reissue specification; matter printed in italics indicates the additions made by reissue.

*CROSS REFERENCE TO RELATED APPLICATIONS*

*This is a continuation reissue of reissue application U.S. Ser. No. 11/165,554, filed Jun. 24, 2005, which is a reissue of U.S. Pat. No. 6,583,844, issued Jun. 24, 2003, the subject matter of which is incorporated by reference herein.*

BACKGROUND OF THE INVENTION

1. Field of the Invention

The present invention relates to a liquid crystal display device and, more particularly, to an active matrix type of liquid crystal display device.

2. Description of the Related Art

An active matrix type of liquid crystal display device is characterized by a structure in which a switching element made of, for example, a thin-film transistor (TFT) is incorporated in each pixel of its liquid crystal display panel.

The active matrix type of liquid crystal display device has, as a chamber for a liquid crystal, a pair of substrates (at least one of which is a so-called transparent substrate having a sufficient optical transmissivity) which are arranged to oppose each other across the liquid crystal, and a pixel group is formed in a direction in which the liquid crystal is spread along the main surface of this substrate. This pixel group includes pixels each of which is provided in a portion surrounded by two adjacent ones of a plurality of scanning signal lines formed over the main surface of one of the pair of substrates which faces the liquid crystal (a liquid crystal layer) and by two adjacent ones of a plurality of video signal lines formed to cross the plurality of scanning signal lines. Each of the pixels is provided with a switching element to be driven by a scanning signal supplied from one of the two adjacent scanning signal lines and a pixel electrode to which a video signal supplied from one of the two adjacent video signal lines via this switching element is to be applied.

In this structure, a signal from a scanning driving circuit is inputted from one end of each of the scanning signal lines, while a signal from a video signal driving circuit is inputted from one end of each of the video signal lines. These driving circuits are mounted on the periphery of one of the substrates (the transparent substrate).

Each of the driving circuits is arranged to receive an input signal from a control circuit or the like which is mounted on, for example, a printed circuit board, but in this case, the transmission of signals to the driving circuits is effected by a flexible wiring board connected between the printed circuit board and one of the substrates of the liquid crystal display panel (for example, the transparent substrate on which the driving circuits are mounted).

The aforementioned flexible wiring board (also called "the flexible printed circuit board", or "FPC" as its abbreviation) being utilized for the liquid crystal display device is disclosed in e.g. the Japanese Patent Laid-Open Nos. 270814/1995, 123489/1998, 38430/1999, and 52409/1999.

SUMMARY OF THE INVENTION

However, in a trend toward an increase in the size of the liquid crystal display device constructed in the above-described manner, it has been pointed out that a defective connection occasionally occurs between the flexible wiring board and one transparent substrate of the liquid crystal display panel.

In the above-described liquid crystal display device, one of the pair of substrates (for example, the transparent substrate) and the flexible wiring board are constructed so that each of interconnecting terminals formed on the substrate and the corresponding one of interconnecting terminals formed on the flexible wiring board are opposed and connected to each other. It has been found out that if the flexible wiring board is thermally expanded, the positions of the interconnecting terminals formed on the flexible wiring board deviate from those of the corresponding interconnecting terminals formed on the transparent substrate.

Measures against this deviation have become indispensable because the deviation becomes larger in proportion to-an increase in the size of the liquid crystal display device (to be exact, the liquid crystal display panel).

It has also been found out that the harmful effect of thermal expansion of the flexible wiring board occurs not only while the flexible wiring board is being connected to one of the transparent substrates of the liquid crystal display panel, but also after the flexible wiring board has been connected.

This is because even after the flexible wiring board has been correctly connected, the connecting portions of the flexible wiring board may peel due to an expansion of the flexible wiring board.

Moreover, in the trend toward an increase in the size of the liquid crystal display device constructed in the above-described manner, it has been pointed out that a waveform distortion easily occurs in a video signal which is transmitted through a video signal line or lines located on one side in the direction of juxtaposition of video signal lines among a plurality of video signal lines juxtaposed over the main surface of the substrate.

In the case of a structure in which signals are supplied from the control circuit to the respective driving circuits via the flexible wiring board, it has been found out that a video signal transmitted to a video signal line which is distant from the control circuit suffers a distortion in its signal waveform during the process of transmission by the influence of another connected driving circuit.

The present invention has been made in view of the above-described problems, and an object of the present invention is to provide a liquid crystal display device which is suitable for preventing the defective connection of a flexible wiring board to a transparent substrate of a liquid crystal display panel in spite of an increase in the size of the liquid crystal display panel.

Another object of the present invention is to provide a liquid crystal display device which is suitable for preventing, in spite of an increase in the size of the liquid crystal display panel, the waveform distortion of a signal transmitted to a signal line which is located on one side of the liquid crystal display panel in the direction of juxtaposition of signal lines, among a plurality of signal lines juxtaposed on the main surface of the substrate.

Representative features of the invention disclosed in the present application will be described below in brief.

<Means 1>

A liquid crystal display device comprises:

a liquid crystal display panel having a liquid crystal (a liquid crystal layer), a pair of substrates (at least one of which is a so-called transparent substrate) arranged to oppose each other across the liquid crystal to constitute a chamber for the liquid crystal, and a plurality of pixels arranged along a spreading direction of the liquid crystal;

driving circuits juxtaposed on the liquid crystal display panel (one of the pair of substrates), for supplying video signals or scanning signals to the plurality of pixels; and a flexible wiring board extended along a direction in which the plurality of driving circuits are juxtaposed, for supplying signals to input sides of the plurality of driving circuits, respectively, from a control circuit (which is mounted on, for example, a printed circuit board such as a control circuit board), wherein a structure for relaxing thermal expansion is adopted in a portion of the flexible wiring board on a side thereof connected to the driving circuits with respect to the extension direction of the flexible wiring board. This structure need not necessarily be applied to a portion which is located on the opposite side to the aforesaid portion with respect to the extension direction. One specific example of this structure is that the flexible wiring board is divided into plurality along the extension direction.

In the liquid crystal display device constructed in this manner, because the length of the flexible wiring board (for example, the overall longitudinal length) is shorter than that in a conventional structure, even if the flexible wiring board is thermally expanded, it is possible to reduce thermal stress which occurs in the connecting portions between the flexible wiring board and the driving circuits.

Accordingly, in spite of an increase in the size of the liquid crystal display panel, it is possible to prevent the defective connection of the flexible wiring board to the transparent substrate of the liquid crystal display panel.

<Means 2>

In the liquid crystal display device of the above-described means 1, the control circuit is characterized by being constructed so that a signal is supplied from the control circuit to each of the flexible wiring boards.

In accordance with the liquid crystal display device constructed in this manner, the distances from the connecting portion of each of the flexible wiring boards to the most distant signal line and to the neighboring signal line or lines are shorter than those in the conventional structure, whereby it is possible to prevent occurrence of the waveform distortion of signals to be supplied to the signal lines. The capacity of the interconnecting lines of the flexible wiring board are increased by the driving circuits in which circuits which repeat charging and discharging are incorporated, but such capacity can be decreased to a great extent because the number of the driving circuits 6 can be reduced to half by using the above-described structure.

Accordingly, in spite of an increase in the size of the liquid crystal display panel, it is possible to prevent waveform distortion from occurring in a signal on a signal line which lies on one side of the liquid crystal display panel in the direction of juxtaposition of the signal lines.

These and other objects, features and advantages of the present invention will become more apparent from the following description when taken in conjunction with the accompanying drawings.

BRIEF DESCRIPTION OF THE DRAWINGS

FIG. 4A shows the plan-view arrangement thereof and FIG. 4B shows a cross-sectional structure thereof respectively;

FIG. 6A shows the plan-view arrangement thereof and FIG. 6B shows a cross-sectional structure thereof respectively;

DETAILED DESCRIPTION

Embodiments of a liquid crystal display device according to the present invention will be described below with reference to the accompanying drawings.

Embodiment 1

<Entire Structure>

Figure 1:
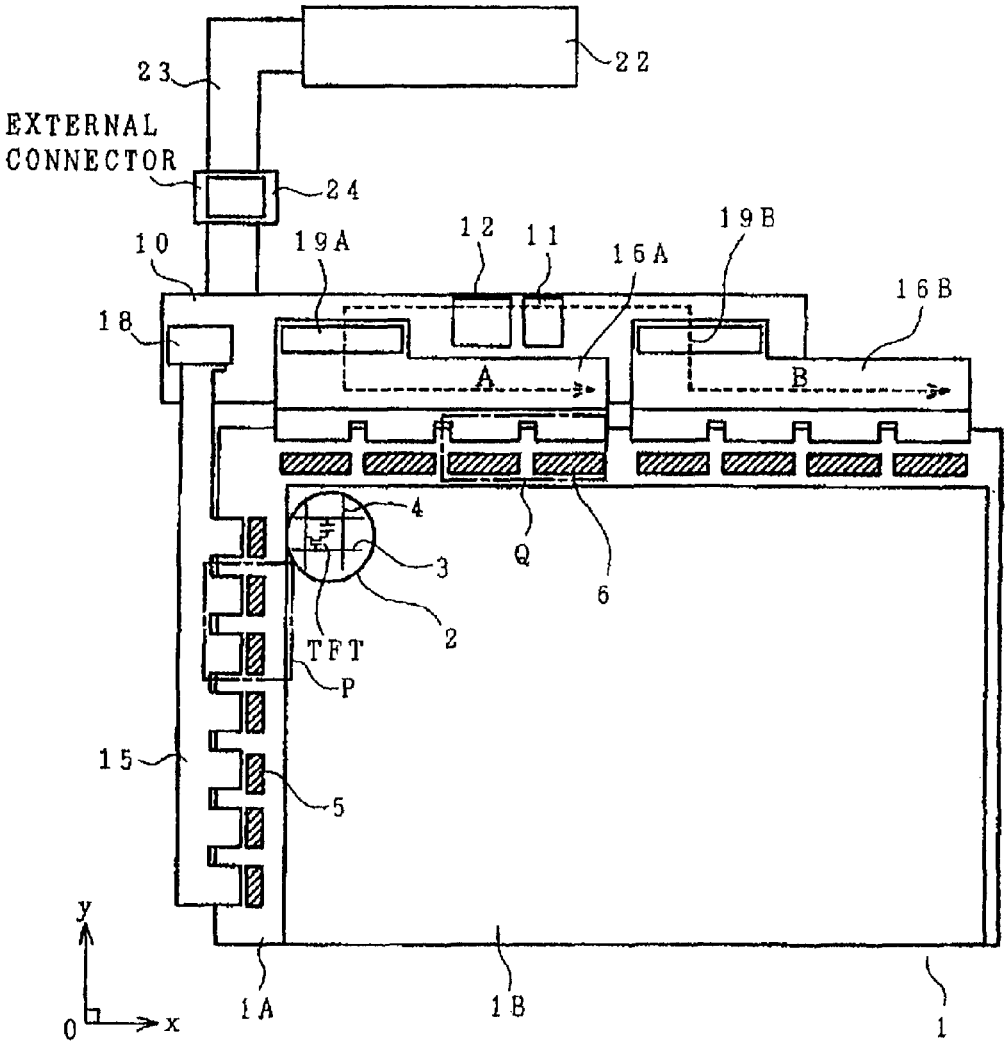
FIG. 1 is a plan view showing the entire structure of one embodiment of a liquid crystal display device according to the present invention.

FIG. 1 is a schematic view showing, the structure of the entire liquid crystal display device according to the present invention.

In this embodiment, the present invention is applied to a liquid crystal display device which adopts a so-called lateral electric field type (also called an In-Plane-Switching type or IPS type) known as a type having a wide viewing angle.

In FIG. 1, a liquid crystal display panel 1 is constructed as a chamber for a liquid crystal (not shown) which has transparent substrates 1A and 1B arranged to oppose each other across the liquid crystal. In this case, one of the transparent substrate (the lower substrate shown in FIG. 1: the matrix substrate 1A) is formed to be slightly larger than the other transparent substrate (the upper substrate shown in FIG. 1: the color filter substrate 1B), and, as viewed in FIG. 1, the bottom and right edges of the transparent substrate 1A are nearly flush with the bottom and right edges of the transparent substrate 1B, respectively.

Accordingly, as viewed in FIG. 1, the left and top peripheries of the transparent substrate 1A are formed to be extended outward from the left and top peripheries of the transparent substrate 1B, respectively. As will be described later in detail, this extended portion is an area in which gate driving circuits and drain driving circuits are mounted.

A plurality of pixels 2 are arranged in a two-dimensional (matrix) form in the area of the transparent substrate (matrix substrate) 1A which overlaps the transparent substrate (color filter substrate) 1B. Each of the pixels 2 is formed in an area surrounded by scanning signal lines 3 which are formed to be extended in an x direction as viewed in FIG. 1 and to be juxtaposed in a y direction as viewed in FIG. 1 and video signal lines 4 which are formed to be extended in the y direction and to be juxtaposed in the x direction. Each of the pixels 2 is at least provided with a switching element TFT to be driven by the supply of a scanning signal from one of the video signal lines 3, and a pixel electrode to which a video signal is to be applied, the video signal being supplied from one of the video signal lines 4 via the switching element TFT.

As described above, since the present embodiment adopts the so-called lateral electric field type, each of the pixels 2 is provided with a reference electrode and an added capacitive element in addition to the above-described switching element TFT and pixel electrode, as will be described later in detail.

Each of the scanning signal lines 3 is formed over the-transparent substrate 1A in such a manner that one end of the same (the left end as viewed in FIG. 1) is extended outward from the overlapping area of the transparent substrate 1A which overlaps the transparent substrate 1B, and the scanning signal line 3 is connected at this one end to the output terminal of the corresponding one of gate driving circuits (ICs) 5 which are mounted on the transparent substrate 1A.

The scanning signal lines 3 are divided into groups each including adjacent scanning signal lines, for the respective gate driving circuits 5 provided on the transparent substrate 1A, and each of these groups of the scanning signal lines 3 is connected to the closest one of the plurality of gate driving circuits 5.

The structure of this portion will be described later in detail with reference to. FIG. 4.

Similarly to the scanning signal lines 3, each of the video signal lines 4 is formed over the transparent substrate 1A in such a manner that one end of the same (the top end as viewed in FIG. 1) is extended outward from the overlapping area of the transparent substrate 1A which overlaps the transparent substrate 1B, and the video signal line 4 is connected at this one end to the output terminal of the corresponding one of drain driving circuits (ICs) 6 which are mounted on the transparent substrate 1A.

The video signal lines 4 are divided into groups, each including adjacent scanning signal lines, for the respective plurality of drain driving circuits 6 provided on the transparent substrate 1A, and each of these groups of the video signal lines 4 is connected to the closest one of the plurality of drain driving circuits 6.

The structure of this portion will be described later in detail with reference to FIG. 6.

A printed circuit board 10 (a control circuit board 10) is arranged in proximity to the liquid crystal display panel 1 provided with the gate driving circuits 5 and the drain driving circuits 6 in the above-described manner, and a control circuit 12 for supplying input signals to the gate driving circuits 5 and the drain driving circuits 6 are mounted on the printed circuit board 10 in addition to a source circuit 11 and the like.

Signals from this control circuit 12 are supplied to the gate driving circuits 5 and to the drain driving circuits 6 through flexible wiring boards (a gate circuit board 15, a drain circuit board 16A and a drain circuit board 16B).

The matrix substrate 1A on which the gate driving circuits 5 are mounted is provided with signal input terminals for the respective gate driving circuits 5. One of the flexible wiring boards (the gate circuit board 15) has terminals which respectively correspond to the signal input terminals for the gate driving circuits 5, and is mounted on the periphery of the matrix substrate 1A (the left end thereof as viewed in FIG. 1) so that these terminals are made to correspond to the signal input terminals for the gate driving circuits 5, respectively.

A portion of the gate circuit board 15 is formed to be extended to the control board 10, and is connected at the extended portion to the control board 10 via a connecting portion 18.

Output signals from the control circuit 12 mounted on the control board 10 are inputted to the respective gate driving circuits 5 through interconnecting layers on the control board 10, the connecting portion 18 and interconnecting layers on the gate circuit board 15.

The matrix substrate 1A on which the drain driving circuits 6 are mounted is provided with signal input terminals for the respective drain driving circuits 6. Each of the other flexible wiring boards (the drain circuit boards 16A and 16B) has terminals which respectively correspond to the signal input terminals for the drain driving circuits 6, and is mounted on the periphery of the matrix substrate 1A (the top end thereof as viewed in FIG. 1) so that these terminals are made to correspond to the signal input terminals for the drain driving circuits 6, respectively.

A portion of each of the drain circuit boards 16A and 16B is formed to be extended to the control board 10, and is connected at the extended portion to the control board 10 via the corresponding one of connecting portions 19A and 19B.

Output signals from the control circuit 12 mounted on the control board 10 are inputted to the respective drain driving circuits 16A, 16B through interconnecting layers on the control board 10, the connecting portions 19A and 19B and interconnecting layers on the drain circuit boards 16A and 16B.

One feature of this embodiment resides in a structure in which the drain circuit boards 16A and 16B mounted on the periphery of the matrix substrate 1A on the side of the drain driving circuits 6 are provided as two separate parts as shown in FIG. 1.

The reason why this structure is adopted is to prevent harmful effects caused by thermal expansion due to an increase in the x direction of FIG. 1 in the length of either of the drain circuit boards which accompanies an increase in the size of the liquid crystal display panel 1.

If either of the drain circuit boards 16A and 16B is thermally expanded before the drain circuit boards 16A and 16B are connected to the liquid crystal display panel 1, it is impossible to provide satisfactory electrical connection between this expanded drain circuit board and the liquid crystal display panel 1. This problem occurs when interconnecting terminals are arranged on each of the drain circuit boards 16A and 16B and the liquid crystal display panel 1 (the main surface of the matrix substrate 1A), with the interconnecting terminals of the drain circuit boards 16A and 16B opposed to those of the liquid crystal display panel 1, and the drain circuit boards 16A and 16B are mounted on the liquid crystal display panel 1 so that these interconnecting terminals are connected. Stated in more detail, the interconnecting terminals of each of the drain circuit boards 16A and 16B and those of the liquid crystal display panel 1 (a pair of an interconnecting terminal of either of the drain circuit boards and an interconnecting terminal of the liquid crystal display panel 1) are connected via conductive bodies, respectively. Therefore, if a large thermal expansion occurs in the drain circuit boards (compared to the substrate 1A), the positions of the interconnecting terminals to be connected to each other are deviated from each other.

Even if a satisfactory electrical connection is realized without the above-described harmful effects, there is a possibility that, after the drain circuit boards 16A and 16B are connected to the liquid crystal display panel 1, stress occurs between the connected interconnecting terminals owing to a subsequent thermal expansion of the drain circuit boards and a disconnection occurs between the same.

For this reason, in this embodiment, by dividing a flexible wiring board into two parts which are the drain circuit boards 16A and 16B, the thermal expansion of each of the drain circuit boards 16A and 16B is restrained to relax the above-described harmful effects.

Needless to say, the number of the divided flexible wiring boards need not necessarily be limited to two. If the number of the divided flexible wiring boards is greater than two, the effect on the above-described harmful effect becomes far larger.

In addition, each of the drain circuit boards may be provided with means for making the thermal expansion smaller on a side thereof which is connected to the driving circuits, than on at least the opposite side (for example, the side of each of the drain circuit boards which is connected to the control board 10).

Figure 2:
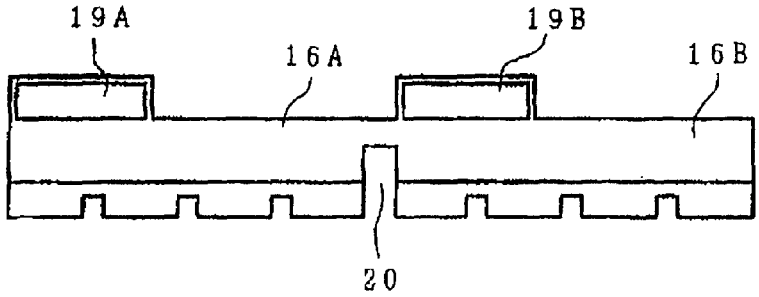
FIG. 2 is a plan view showing the structure of another embodiment of the drain circuit board of the liquid crystal display device according to the present invention.

For example, as shown in FIG. 2, on the side of a drain circuit board connected to the driving circuits, a slit 20 may be formed in the drain circuit board in a direction perpendicular to the longitudinal direction of the same.

In this case, although the drain circuit board is not divided as in the case of the above-described embodiment, it is possible to obtain an effect similar to that obtained in the case of the divided drain circuit boards.

In the present embodiment, the connecting portions 19A and 19B for the control board 10 are formed on the respective drain circuit boards 16A and 16B which are, for example, two divided drain circuit boards, and the mechanical and electrical connections between the drain circuit boards 16A and 16B and the control board 10 are provided by the connecting portions 19A and 19B.

It is apparent from FIGS. 1 and 2 that both of the drain circuit boards utilize flexible wiring boards (called flexible printed circuit boards, also) having a plurality of protruding portions (downwards in FIG. 10B) formed in accordance with a plurality of the drain driving circuits. Advantages of this structural feature will be explained with reference to FIGS. 10A and 10B.

Figure 10A:
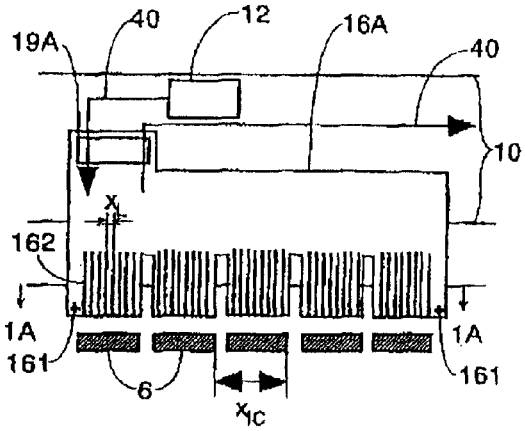
FIG. 10A is an explanatory view showing one of the structural features of the liquid crystal display device according to the present invention in contrast to one of the conventional structures being shown in FIG. 10B.
Figure 10B:
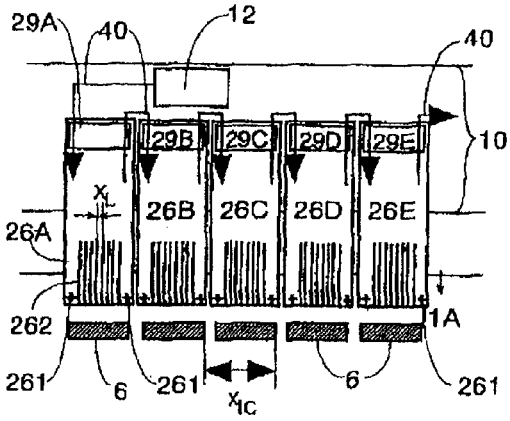

One of the conventional liquid crystal display devices utilizes a plurality of flexible printed circuit board 26A through 26E shown in FIG. 10B, each of which corresponds to one of the drain driving circuits 6. Each of the flexible wiring boards 26A through 26E has at least a pair of alignment marks 261 (cross-shaped marks in FIG. 10B) for positioning a portion thereof on the matrix substrates. The matrix substrates has similar alignment marks (not shown) to those of the flexible wiring board in the vicinity of the terminals thereof (not shown) to be connected to the leads 262 of the flexible wiring board. When the flexible wiring boards are mounted on the periphery of the matrix substrate 1A, both positions of the respective flexible wiring board and the matrix substrate 1A are adjusted in accordance with an optical observation of both pairs of the alignment marks. As the definition of the liquid crystal display panel becomes higher, the interval between the video signal lines 4 adjacent to one another becomes finer, and so does the interval between the scanning signal lines 3 adjacent to one another. However, the width of each of the flexible wiring boards 26A through 26B is so limited geometrically that the pair of alignment marks 261 makes an interval $x_L$, of the leads 262 narrower, even if an interval $x_{IC}$ of the driving circuits 6 remains at the conventional value. As the interval $x_L$ becomes narrower, the interval between the terminals formed at a periphery of the matrix substrate 1A cannot but become narrower. Consequently, the process for positioning the flexible wiring board on the periphery of the matrix substrates becomes more difficult, and the positioning accuracy is easily affected by the thermal expansion of the flexible wiring board.

On the other hand, before mounting the flexible wiring boards 26A through 26E on the printed circuit board 10 comprising the control circuit 12 etc. after mounting them on the matrix substrate 1A, there are some possibilities that the flexible wiring boards are deformed slightly after a heat-treatment for fixing the leads thereof 262 onto the terminals on the matrix substrate 1A. As FIG. 10B shows, each of the flexible wiring boards 26A through 26E has one of the connecting parts 29A through 29E thereat, respectively. Thus, such aforementioned deformations thereof will applies stress to the connecting part thereof and makes positioning the connecting parts thereof onto the printed circuit board difficult, even if the deformations around the leads 262 thereof appears slightly.

With respect to these problems according to the conventional liquid crystal display device having a structure shown in FIG. 10B, the liquid crystal display device according to the present invention utilizing the flexible wiring board 16A shown as FIG. 10A ensures the interval $x_L$ of the leads 162 broader enough and eliminates the aforementioned thermal deformation thereof. In the flexible wiring board 16A, the leads 162 to be connected to the terminals (not shown) on the matrix substrate 1A are formed on the respective protruding portions thereof corresponding to the drain driving circuits 6, respectively. As the protruding portions are combined with each other at one of the sides thereof (at upper sides thereof, in FIG. 10A), those protruding portions may be mounted on the matrix substrate 1A together. Therefore, a pair of alignment marks 161 need not to be formed at each of the protruding portions, because the respective leads 162 of the five protruding portions can be positioned onto the terminals of the matrix substrate 16A together with each other by monitoring at least a pair of alignment marks 161. As numbers of the alignment marks to be formed at protruding portions, the broader areas thereof are obtained for the respective leads 162. Consequently both the interval $x_L$ of the leads 162 and the interval between the terminals to be connected thereto can remains broader, even if the interval $x_{IC}$ of the drain driving circuits 6 becomes narrower.

In the liquid crystal display device according to the present invention, the flexible wiring board is divided to two or more along one of the sides of the liquid crystal display panel. Moreover, each of the two or more flexible wiring boards has a plurality of protruding portions which are separated from each other per one of the drain driving circuits 6 corresponding thereto. These two structural features provide effects mutually to reduce the thermal expansions appearing locally inside the flexible wiring board inside. Therefore, each of the thermal expansions at the respective protruding portion (around the leads 161) of the flexible wiring board 16A is so reduced that any stress does not affect the connecting portion 19A thereof.

The other structural feature of the liquid crystal display device according to the present invention is to separate the flexible wiring board 16A from the printed circuit board 10 carrying electronic components and/or electric components, like the source circuit 11 (the electric power supply, the electric power regulator, or else) and the control circuit 12 (e.g. the timing converter) shown in FIG. 1. If these components are mounted on the flexible wiring board 16A, heat treatment has to be applied to the flexible wiring board to fix the components thereon. In comparison with the heat treatment for connecting the leads 162 of the flexible wiring board to the terminals on the matrix substrate 1A, the aforementioned heat treatment for electronic/electric components is applied locally so as to fix the components more rigidly on to the flexible wiring board. Therefore, the flexible wiring board loses its flexibility which absorbs the aforementioned stress due to the heat treatment other than that for fixing the components. If the components are fixed to the flexible wiring board before mounting it onto the matrix substrate 1A, the thermal expansion at the aforementioned protruding portion can hardly be reduced, and thus the leads thereof will deviate from the respective terminals corresponding to the leads. If the components are fixed to the flexible wiring board after mounting it onto the matrix substrate 1A, the thermal expansions appearing around the components affect the connections between the leads thereof and the terminals corresponding thereto, and the leads will be disconnected from the terminals depending on the circumstances. The combination of the flexible wiring board being utilized simply for conductive paths and the printed circuit board (preferably, more rigid than the flexible wiring board) for mounting the electronic and/or electric components in the liquid crystal display device according to the present invention has an advantage for preventing the above-mentioned problem.

The signal flows 40 in FIGS. 10A and 10B denotes a starting signal inputted to the drain driving circuits 6, or a carry signal (also called an enable signal) being transmitted between the drain driving circuits 6. The characteristics of this signal will be explained later with reference to FIG. 7.

The output from the control circuit 12 on the control board 10 is inputted to the corresponding drain driving circuits 6 via the connecting part 19A of the drain circuit board 16A and the connecting part 19B of the drain circuit board 16B, as shown by dashed lines A and B in FIG. 1.

In the case of this structure, the distances from each of the connecting portions 19A, 19B of the drain circuit boards 16A, 16B to the most distant video signal line 4 from the each connecting portion and to the other video signal line(s) 4 in the vicinity of the most distant video signal line are shorter than those distances in a conventional structure, whereby it is possible to prevent occurrence of the waveform distortion of video signals to be supplied to the video signal lines 4. The capacity of the interconnecting lines of the drain circuit boards 16A and 16B are increased by the drain driving circuits 6 in which circuits which repeat charging and discharging are incorporated, but such capacity can be decreased to a great extend by the number of the drain driving circuits 6 to be mounted on the drain circuit boards 16A and 16B being reduced to half by using the above-described structure.

As shown in FIG. 1, a video signal is supplied from a video signal source 22 to the control board 10 through a cable 23 and an interface board 24, and is inputted to a control circuit 12 mounted on the control board 10.

In FIG. 1, the liquid crystal display panel 1, the gate circuit board 15, the drain circuit boards 16A and 16B and the printed circuit board 10 are shown to be positioned in approximately the same plane. Actually, the printed circuit board 10 is bent at a portion where the gate circuit board 15 and the drain circuit boards 16A and 16B are mounted, and the bent surface is positioned at approximately right angles to the liquid crystal display panel 1 (the sheet surface of FIG. 1). This arrangement is based on the feature of reducing the area of a so-called frame of the liquid crystal display device. The frame is the area between the outline of the outer frame of the liquid crystal display device and the outline of its display portion, and by reducing this area, it is possible to increase the area of the display portion with respect to the outer frame.

<Structure of Pixel>

Figure 3:
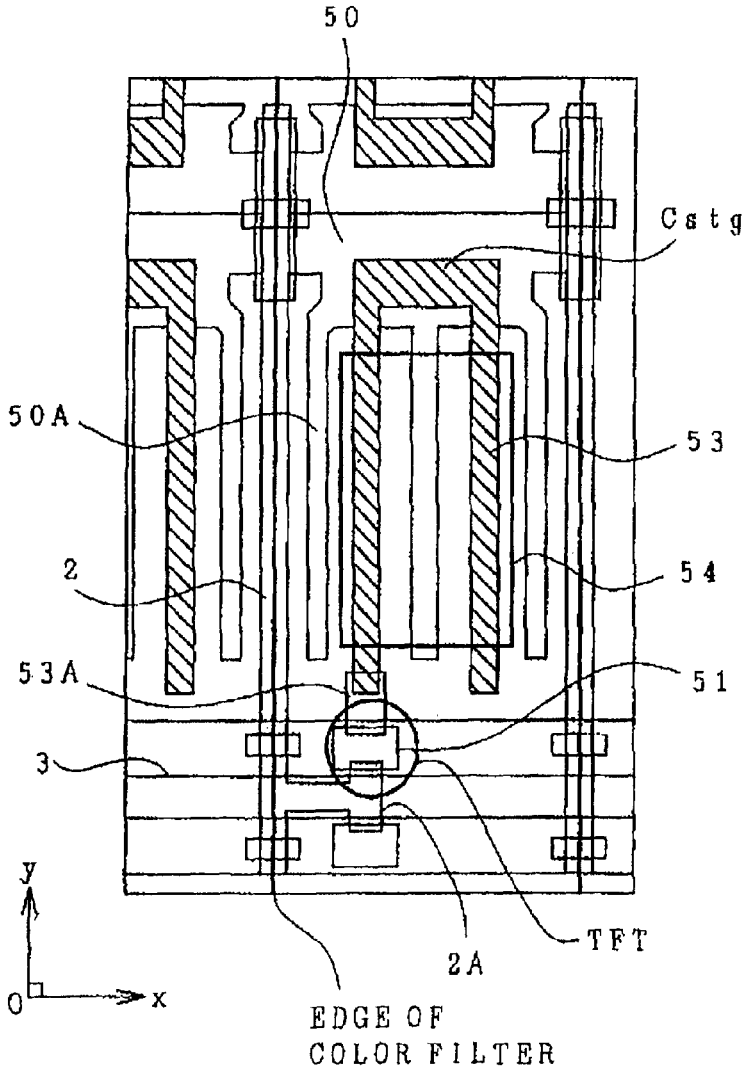
FIG. 3 is a plan view showing one embodiment of a pixel of the liquid crystal display device according to the present invention.

FIG. 3 is a plan view showing in detail the structure of the pixels 2.

Referring to FIG. 3, the scanning signal line 3 and a counter voltage signal line 50 which are disposed to be extended in the x direction are formed on the main surface of the transparent substrate (matrix substrate) 1A. The area surrounded by these signal lines 3 and 50, and the video signal lines 2 (to be described later) which are disposed to be extended in the y direction is a pixel area.

In this embodiment, the counter voltage signal line 50 is formed to run between the scanning signal lines 3 in parallel therewith, and pixel areas are respectively formed to extend in the ±y directions from the counter voltage signal line 50.

With this structure, it is possible to reduce the number of the counter voltage signal lines 50 juxtaposed in the y direction to approximately half of the conventionally required number, whereby it is possible to assign the areas occupied by the counter voltage signal lines 50 to the pixel areas and increase the area of the pixel areas.

In each of the pixel areas, for example, three counter electrodes 50A which are extended in the y direction are formed at equal intervals integrally with the counter voltage signal line 50. These counter electrodes 50A are not connected to but extended to positions close to the scanning signal line 3, and the outside two of the counter electrodes 50A are arranged adjacently to the video signal lines 2 and the remaining one counter electrode 50A is positioned in the middle (between the outside two counter electrodes 50A and apart from the same).

Furthermore, an insulation layer made of, for example, a silicon nitride layer is formed to cover the scanning signal lines 3 and others, over the main surface of the transparent substrate 1A on which the scanning signal line 3, the counter voltage signal lines 50 and the counter electrodes 50A are formed in the above-described manner. This insulation layer functions as an interlayer insulation layer for insulating the video signal lines 2 from the scanning signal lines 3 and the counter voltage signal lines 50, and also functions as a gate insulation layer for the thin-film transistor TFT and as a dielectric film for a storage capacitance Cstg.

On the surface of the insulation layer, a semiconductor layer 51 is formed in an area in which the thin-film transistor TFT is formed. This semiconductor layer 51 is made of, for example, amorphous Si, and is formed to be superposed on the scanning signal line 3 in a portion close to one of the video signal lines 2 which will be described later. Thus, part of the scanning signal line 3 serves as the gate electrode of the thin-film transistor TFT.

The video signal lines 2 which are extended in the y direction and juxtaposed in the x direction are formed on the surface of the insulation layer. Each of the video signal lines 2 is formed integrally with a drain electrode 2A which is formed to extend into a portion of the surface of the semiconductor layer 51 which constitutes the thin-film transistor TFT.

Furthermore, a pixel electrode 53 which is connected to a source electrode 53A of the thin-film transistor TFT is formed on the surface of the insulation layer in the pixel area. This pixel electrode 53 is formed to be spaced apart from two adjacent ones of the counter electrodes 50A and to be extended in the y direction between the two adjacent ones. One end of the pixel electrode 53 also serves as the source electrode 53A of the thin-film transistor TFT, and the pixel electrode 53 is extended from this one end in the y direction toward the counter voltage signal line 50 and is further extended in the x direction along the counter voltage signal line 50, and is again extended in the y direction, thereby forming a U-like shape (which is shown as an inverted U-like shape in FIG. 3).

The portion of the pixel electrode 53 which is superposed on the counter voltage signal line 50 constitutes the storage capacitance Cstg which uses the above-described insulation layer as the dielectric film, in the region between the portion and the counter voltage signal line 50. By the storage capacitance Cstg, video information is stored in the pixel electrode 53 for a long time, for example, when the thin-film transistor TFT is off.

The surface of the semiconductor layer 51 which corresponds to the interface between the drain electrode 2A and the source electrode 53A of the thin-film transistor TFT is doped with phosphorus (F) to form a high N-type impurity concentration layer, thereby providing ohmic contact at each of the drain electrode 2A and the source electrode 53A. The high impurity concentration layer is formed over the entire surface of the semiconductor layer 51, and after the drain electrodes 2A and the source electrodes 53A have been formed, these electrodes 2A and 53A are used as a mask to etch and eliminate the portion of the high impurity concentration layer other than the area in which the electrodes 2A and 53A are formed, thereby forming the above-described structure.

A protective layer made of, for example, a silicon nitride layer is formed over the top surface of the insulation layer on which the thin-film transistors TFT, the video signal lines 2, the pixel electrodes 53 and the storage capacitances Cstg are formed in the above-described manner, and an alignment layer is formed over the top surface of the protective layer, to constitute a so-called lower substrate of the liquid crystal display panel 1 (which corresponds to the previously described matrix substrate 1A).

Although not shown, a black matrix (denoted by reference numeral 54 in FIG. 3) which has apertures in portions corresponding to the respective pixel areas is formed in a liquid-crystal-side portion of the transparent substrate (color filter substrate) 1B which constitute a so-called upper substrate.

Furthermore, color filters are formed to cover the apertures formed in the portions of the black matrix 54 which correspond to the respective pixel areas. These color filters have colors which differ from those between adjacent pixel areas in the x direction, and the respective color filters have boundaries on the black matrix 54.

A flat layer made from a resin layer or the like is formed over the surface on:

which the black matrix 54 and the color filters are formed in this manner, and an alignment layer is formed over the surface of the flat layer.

<Peripheral Structure of Gate Driving Circuit>

Figure 4A:
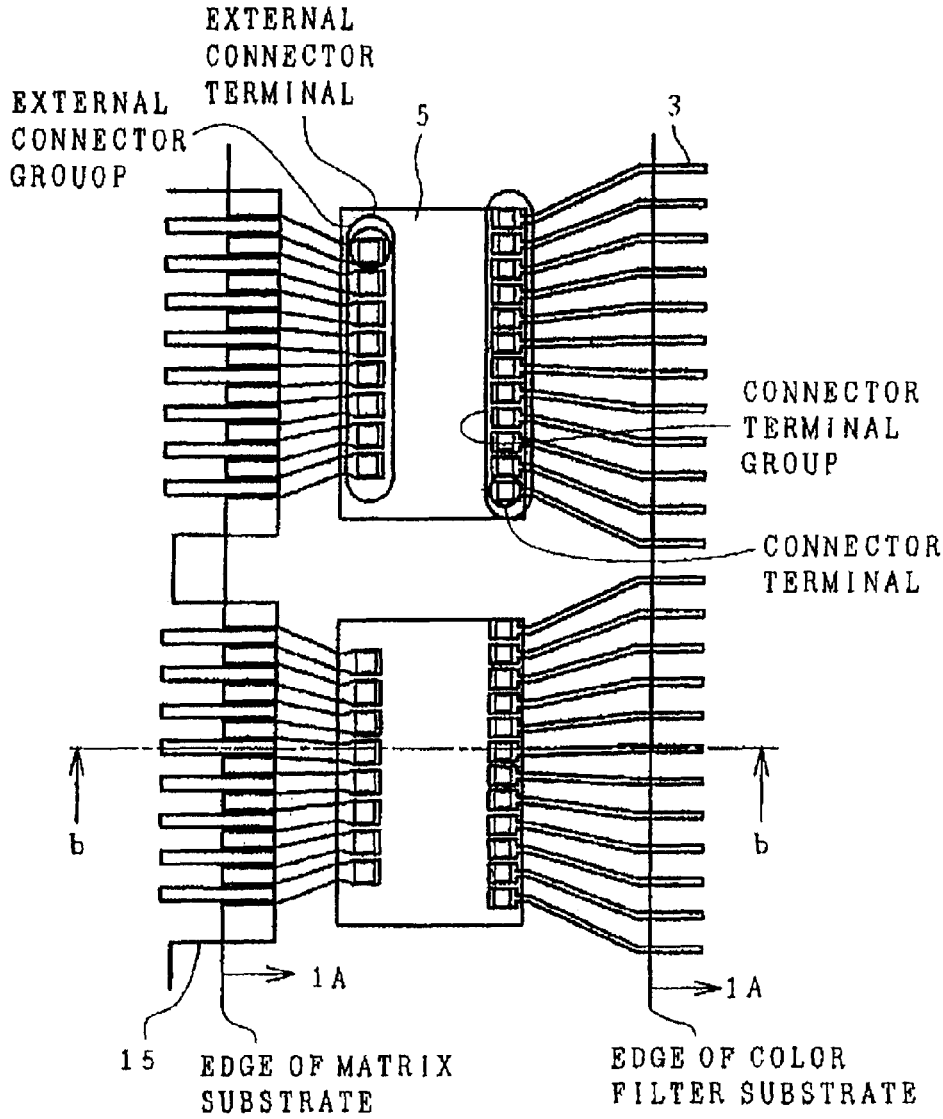
FIGS. 4A and 4B are views showing the structure of one embodiment of a gate driving circuit and the peripheral portion thereof in the liquid crystal display device according to the present invention.
Figure 4B:
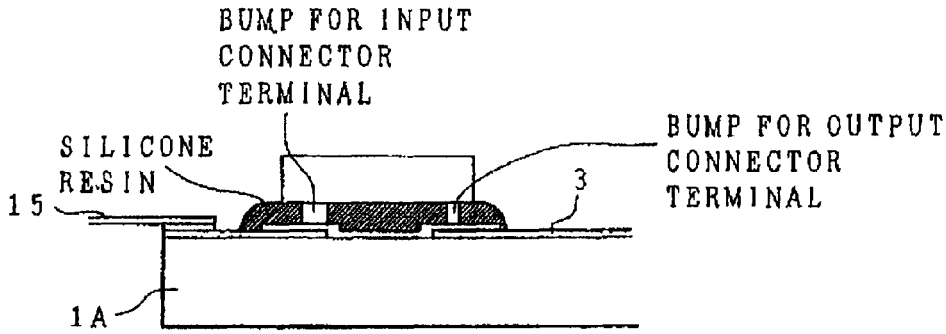

FIGS. 4A and 4B are views showing the details of the structure of the gate driving circuits 5 and the peripheral structure thereof. FIG. 4A is a plan view showing the portion of a frame P surrounded by dot-dashed lines in FIG. 1, and FIG. 4B is a cross-sectional view taken along line b—b of FIG. 4A.

In FIGS. 4A and 4B, the scanning signal lines 3 are formed to be extended from the right side as viewed in the figures over the surface of the transparent substrate (matrix substrate) 1A. These scanning signal lines 3 are divided into groups each including adjacent scanning signal lines, and the scanning lines which belong to each of the groups are bent to converge toward the gate driving circuit 5 and terminals are formed at the converging ends of the respective scanning lines.

These respective terminals are disposed to correspond to electrodes (bumps) on the output side of the gate driving circuit 5, and the terminals is equal in pitch to the electrodes.

Each of the gate driving circuits 5 is constructed of a semiconductor integrated circuit (IC), and is mounted on the transparent substrate 1A (facedown-bonding) with its surface on which the electrodes are formed being faced down.

Interconnecting layers which are respectively connected to electrodes (bumps) on the input side of each of the gate driving circuits 5 are formed over the transparent substrate 1A, and are extended to a peripheral edge of the transparent substrate 1A.

The extended portions of the interconnecting layers constitute portions to be connected to terminals formed on the gate circuit board 15, and the extended portions is equal in pitch to the terminals.

As described previously, signals from the control circuit 12 on the control board 10 are inputted to the respective gate driving circuits 5 via interconnecting lines formed on the gate circuit board 15, and the output from each of the gate driving circuits 5 is supplied to the scanning signal lines 3.

Figure 5:
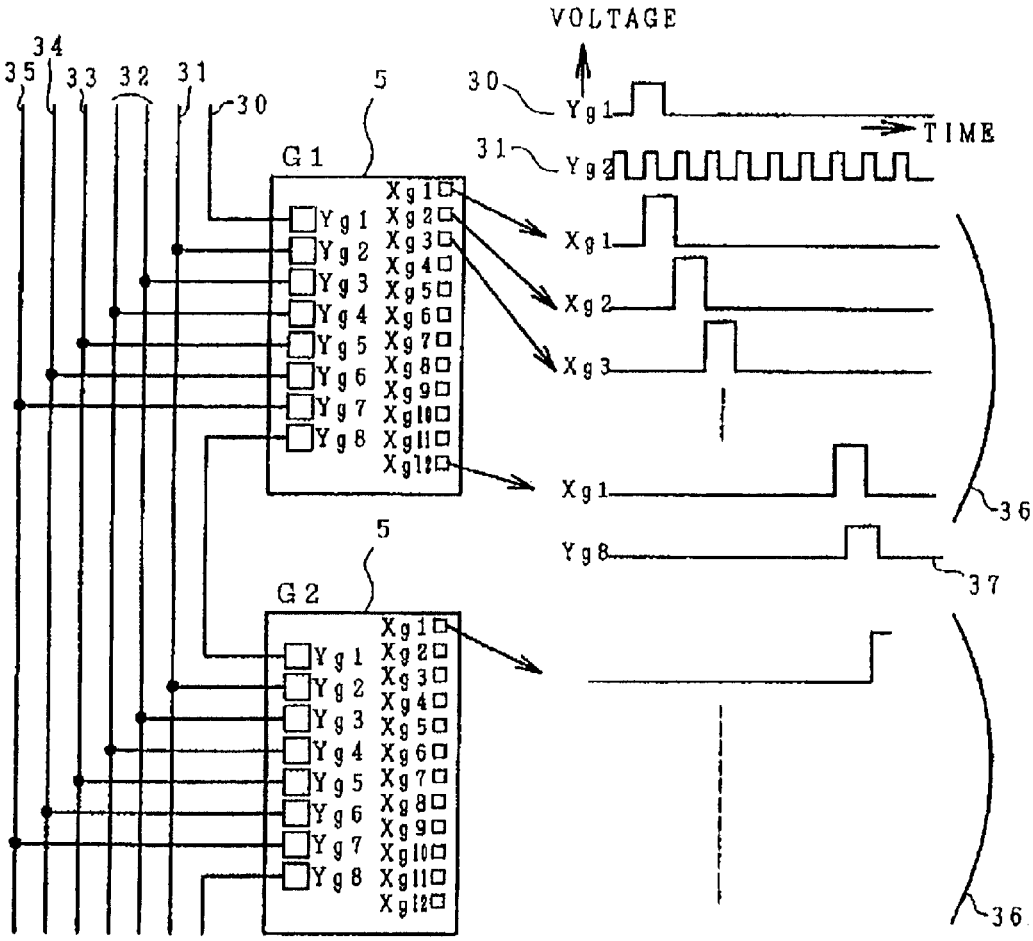
FIG. 5 is an explanatory view showing the relationship between the input and output signals of the gate driving circuit in the liquid crystal display device according to the present invention.

FIG. 5 shows the relationship between individual signals to be inputted to each of the gate driving circuits 5 via the gate circuit board 15 (i.e., individual signals outputted from the control circuit 12) and signals to be supplied from each of the gate driving circuits 5 to the corresponding scanning signal lines 3.

The line 30 transmits a starting signal for the gate driving circuit G1 as disposed at a first stage in a scanning, or a carry signal (also called an enable signal) for the gate driving circuit G1 as disposed at a stage other than the first stage therein. The starting signal or the carry signal being supplied from the line 30 to the terminal Yg1 of the gate driving circuit G1 has a wave form 30 shown at a right side in FIG. 5. When the wave form 30 shows "High", the scanning sequence in the gate driving circuit G1 is triggered.

The line 31 transmits a shift clock signal for regulating a scanning sequence. The shift clock signal is supplied from the line 31 to the terminal Yg2 of each of the gate driving circuits G1, G2, etc. in parallel, and has a wave form 31 shown at a right side in FIG. 5.

The lines 32 supply electric powers for the gate driving circuits. The lines 33 and 34 supply voltages utilized for outputs of the gate driving circuits, one of the lines supplies a voltage corresponding to a high level of the outputs, and another of the lines supplies a voltage corresponding to a low level thereof. The line 35 transmits a signal for reversing the scanning sequence from downward direction to upward direction and vice versa in FIG. 5. Each of the gate driving circuits G1, G2, etc. has twelve terminals for outputting signals for regulating the switching elements TFT through each of the scanning signal lines 3 shown in FIG. 1. As the wave forms 36 outputted from the terminals Xg1, Xg2, Xg3, and Xg12 show "Highs" one by one, each of the signals outputted from the twelve terminals Xg1 through Xg12 shows "High" successively in accordance with that of the shift clock signal 31.

When the scanning sequence in the gate driving circuit G1 is finished, the carry signal (called the enable signal, also) is outputted from the terminal Yg8 of the gate driving circuit G6 and inputted to the terminal Yg1 of the gate driving circuit G2. The carry signal outputted from the terminal Yg8 of the gate driving circuit G1 has a wave form 37 shown at a right side in FIG. 5, and the "High" output thereof triggers off the scanning sequence in the gate driving circuit G2 as the signal wave form outputted from the terminal Xg1 of the gate driving circuit G2.

<Peripheral Structure of Drain Driving Circuit>

Figure 6A:
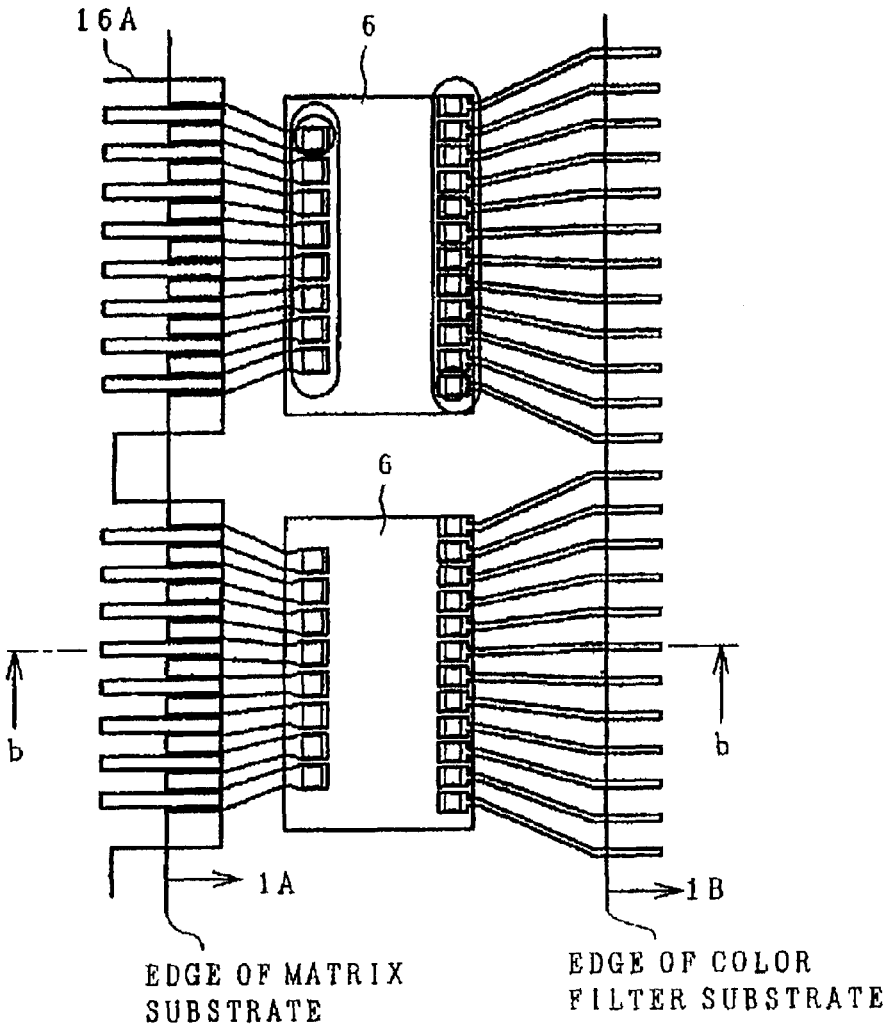
FIGS. 6A and 6B are views showing the structure of one embodiment of a drain driving circuit and the peripheral portion thereof in the liquid crystal display device according to the present invention.
Figure 6B:
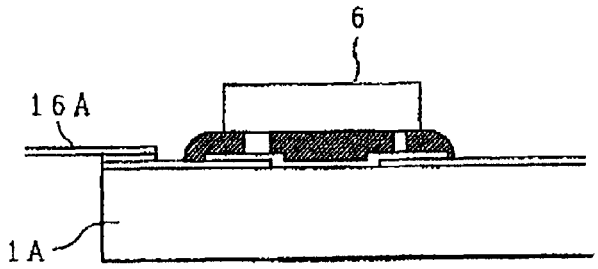

FIGS. 6A and 6B are views showing the details of the structure of the drain driving circuits 6 and the peripheral structure thereof. FIG. 6A is a plan view showing the portion of a frame Q surrounded by dot-dashed lines in FIG. 1, and FIG. 6B is a cross-sectional view taken along line b—b of FIG. 6A.

As is apparent from FIGS. 6A and 6B, the structure of the drain driving circuits 6 (called the video signal driving circuits, or the source driving circuits, also) and the peripheral structure thereof are nearly similar to the structure of the gate driving circuits 5 and the peripheral structure thereof.

The peripheral structure of the drain driving circuits, 6 differs from that of the gate driving circuits 5 in that, as described previously with reference to FIG. 1, among the drain driving circuits 6 juxtaposed in the x direction of FIG. 1, each of the drain driving circuits 6 included in the left-half group is supplied with a signal from the drain circuit board 16A, while each of the drain driving circuits 6 included in the right-half group is supplied with a signal from the drain circuit board 16B.

Figure 7:
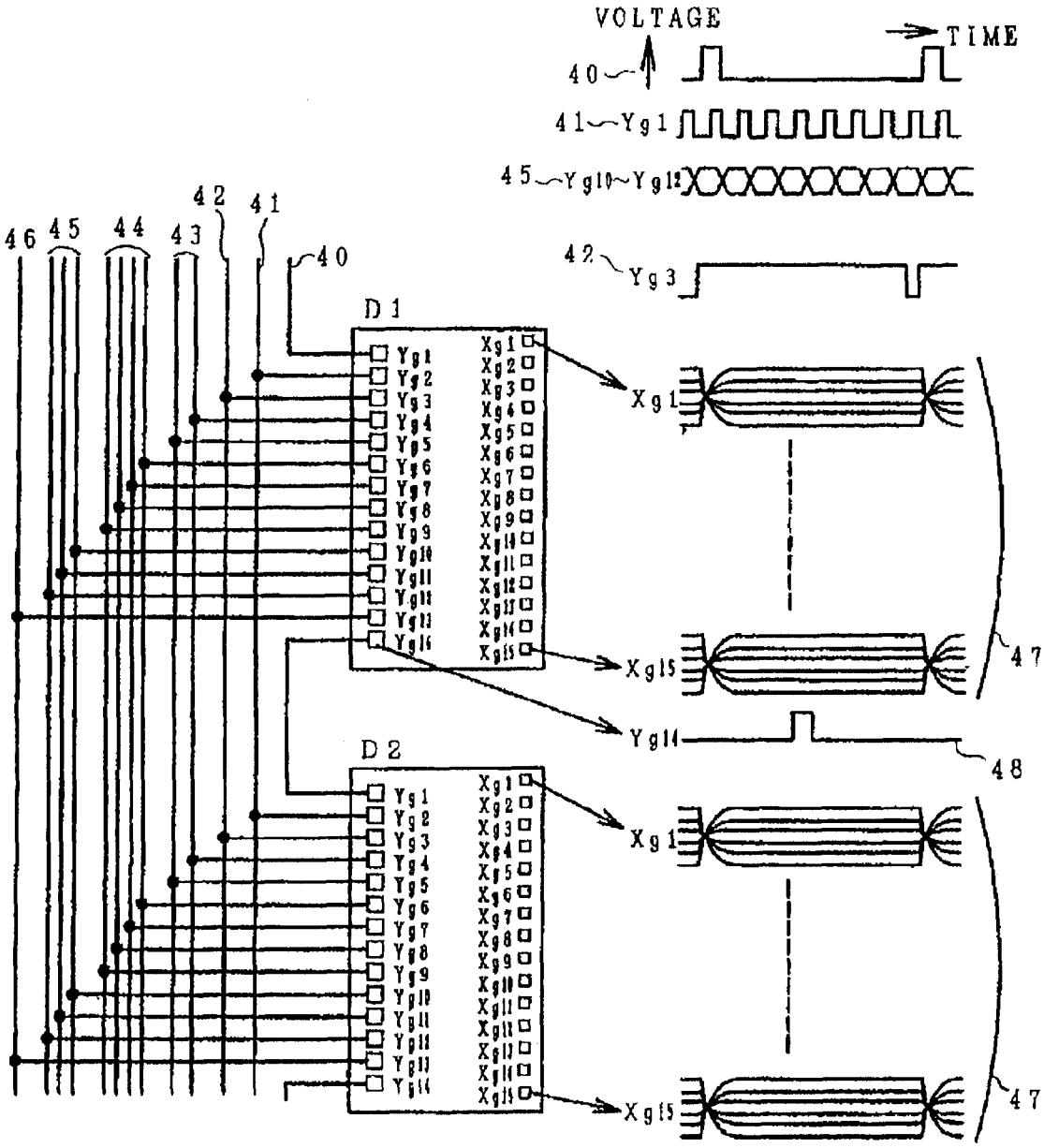
FIG. 7 is an explanatory view showing the relationship between the input and output signals of the drain driving circuit in the liquid crystal display device according to the present invention.

FIG. 7 shows the relationship between individual signals to be inputted to each of the drain driving circuits 6 via the drain circuit board 16A (i.e., individual signals outputted from the control circuit 12) and signals to be supplied from each of the drain driving circuits 6 to the corresponding video signal lines 4.

The line 40 transmits a starting signal for the drain driving circuit D1 as disposed at a first stage in a video signal acquisition, or a carry signal (also called an enable signal) for the drain driving circuit D1 as disposed at a stage other than the first stage therein. The starting signal or the carry signal being supplied from the line 40 to the terminal Yg1 of the drain driving circuit D1 has a wave form 40 shown at a right side in FIG. 7. When the wave form 40 shows "High", the scanning sequence in the drain driving circuit D1 is triggered.

The line 41 transmits a clock signal for regulating a video signal acquisition sequence. The clock signal is supplied from the line 41 to the terminal Yg2 of each of the drain driving circuits D1, D2, etc. in parallel, and has a wave form 41 shown at a right side in FIG. 7.

The line 42 transmits a clock signal for regulating output timings for liquid crystal driving voltage supplied from the drain driving circuits to the video signal lines 4. The clock signal is supplied from the line 42 to the terminal Yg3 of each of the drain driving circuits D1, D2, etc. in parallel, and has a wave form 42 shown at a right side in FIG. 7. The wave form 42 has an inverted shape of that of the aforementioned shift clock signal 31.

The two lines 43 supply electric powers for the drain driving circuits. The four lines 44 supply voltages utilized for outputs of the drain driving circuits, and the respect voltages being supplied thereby have different values from each other in accordance with gray scales to be displayed in the liquid crystal display panel.

The three lines 45 transmit the video signals for determining a voltage outputted from each of the terminal Xg1 through Xg15 of the respective drain driving circuits D1, D2, etc. Each of the video signals has either a "High" state (so-called "1") or a "Low" state (so-called "0") as shown by a "Eye-diagram" at the right side in FIG. 7. The drain driving circuit D1 acquires the respective video signals corresponding to the terminals thereof Xg1 through Xg15, and accumulates the data therein sequentially. When the video signal acquisition in the drain driving circuit D1 is finished, the carry signal (called the enable signal, also) is outputted from the terminal Yg14 of the drain driving circuit D1 and inputted to the terminal Yg1 of the drain driving circuit D2. The carry signal outputted from the terminal Yg14 of the drain driving circuit D1 has a wave form 48 shown at a right side in FIG. 7, and the "High" output thereof triggers off the video signal acquisition in the drain driving circuit D2 in a similar manner to that in the drain driving circuit D1 mentioned above. The video signal acquisitions and data accumulations thereof for each of the plurality of the drain driving circuits being juxtaposed along one side of the liquid crystal display panel 1 (as shown in FIG. 1) are progressed successively by the carry signal transmission therebetween. When the video signal acquisitions and data accumulations are finished, each of the plurality of the drain driving circuits outputs the voltage signals from the terminals thereof Xg1 through Xg15 to the respective video signal lines 4 corresponding thereto. Each of the plurality of the drain driving circuits determines the voltages to be outputted from the respective terminals Xg1 through Xg15 (the gray scales for the respective video signal lines 4, in other words) in accordance with the data being accumulated during the aforementioned video signal acquisition process, selects a proper voltage from the four kinds of voltages supplied by the lines 44, and supplies the respective proper voltages from the terminals Xg1 through Xg15 to the video signal lines 4. Therefore, the voltage being outputted from each of the terminals Xg1 through Xg15 may take several kinds of values as the wave forms 47 shows, and has a different wave form from those of the aforementioned twelve terminals Xg1 through Xg12 of the gate driving circuits G1, G2, etc.

The line 46 transmits a signal for reversing the sequence for acquiring the video signals from downward direction to upward direction and v.v. in FIG. 7.

FIGS. 6A and 6B show the state in which the drain driving circuits 6 are juxtaposed in the x direction, whereas FIG. 7 shows the state in which the drain driving circuits 6 are juxtaposed in the y direction.

<Flexible Wiring Board>

Figure 8:
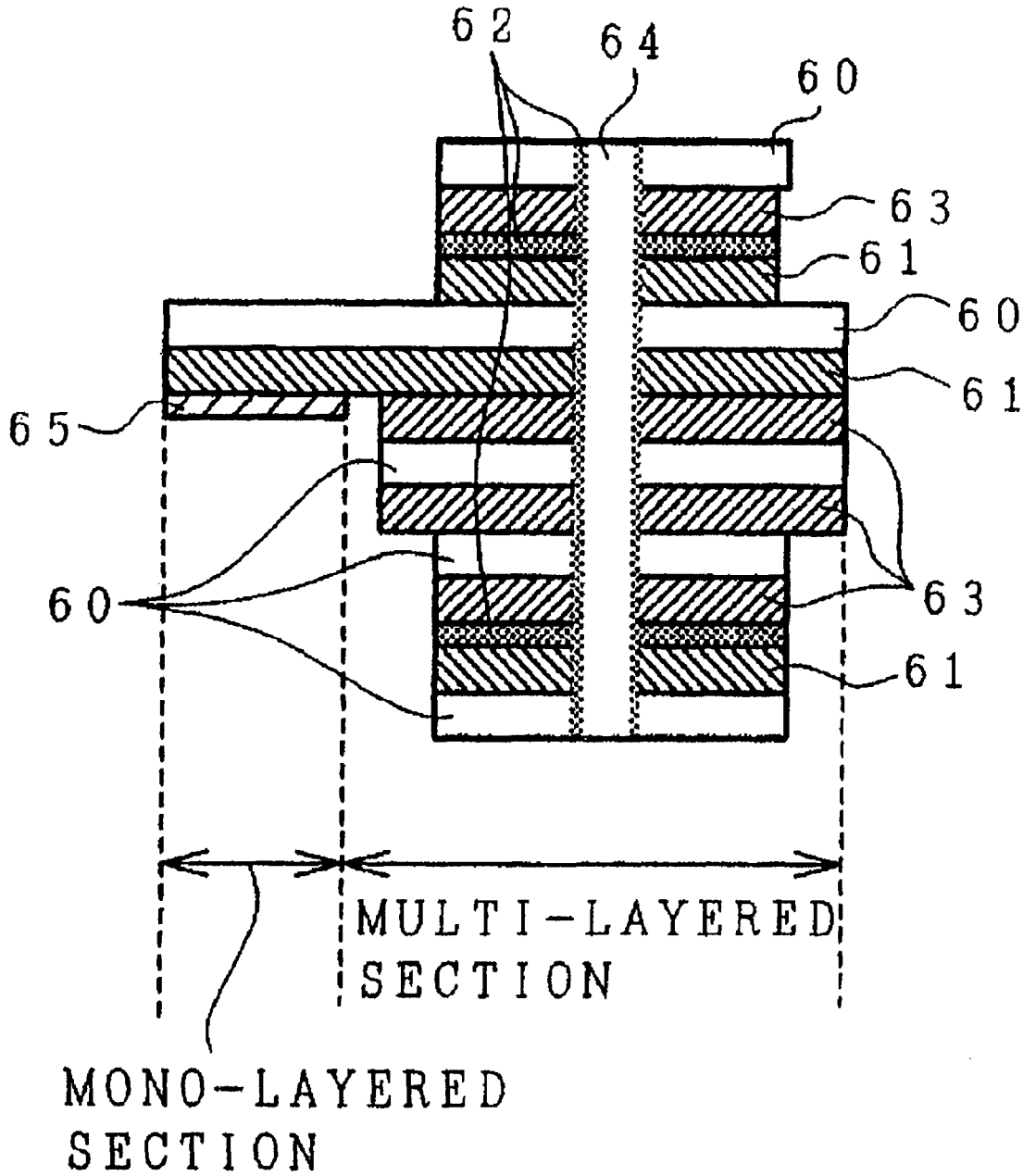
FIG. 8 is a cross-sectional view showing the structure of a flexible wiring board used in the liquid crystal display device according to the present invention.

FIG. 8 shows a cross section of each of the gate circuit board 15, the drain circuit board 16A and the drain circuit board 16B. As is apparent from FIG. 8, each of the circuit boards 15, 16A and 16b is formed of a multilayered structure. An interconnecting layer 61 made of Cu (copper) is formed over a surface of a substrate made from a polyimide film 60, and the surface (the top surface as viewed in FIG. 8) of the interconnecting layer 61 is coated with Cu plating 62. Layers each having such stacked structure are bonded together by an adhesive 63, to constitute the multilayered structure.

The interconnecting layers of the respective layers are electrically connected to one another by a conductive material charged in a through-hole 64 formed through the overlapping portions of the interconnecting layers. The "Multi-Layered Section" in FIG. 8 contains at least two conductor layers (three Cu-layers 61, in FIG. 8) being stacked on each other and spaced by insulating layer (a polyimide film 60, in FIG. 8).

In this case, a portion connected to the liquid crystal display panel 1 is made from a single Cu interconnecting layer 61, and its terminal is coated with Au plating 65. The "Mono-Layered Section" in FIG. 8 has a single conductor layer like the single Cu interconnecting layer 61.

Other Embodiments

The above-described embodiment is constructed in such a manner that the output from the control circuit 12 is inputted to each of the two drain circuit boards 16A and 16B connected to the drain driving circuit 6.

This structure is intended to restrain the occurrence of waveform distortion of video signals to be supplied to the video signal lines.

However, if it is only necessary to achieve the purpose of preventing harmful effects due to the thermal expansion of the drain circuit boards 16A and 16B, instead of the above-described structure, it is also preferable to adopt a structure in which the output from the control circuit 12 is inputted to the drain circuit board 16A and further to the drain circuit board 16B via the drain circuit board 16A.

For example, the drain circuit boards 16A and 16B merely take the form of being divided from each other, and the signal transmission path of each of the drain circuit boards 16A and 16B has a structure similar to that of a conventional signal transmission path.

One specific example of such signal transmission path will be described below with reference to FIG. 1. As shown, the drain circuit board 16A is mechanically and electrically connected to the control board 10 at the connecting part 19A, whereas the drain circuit board 16B is only mechanically connected to the control board 10 at the connecting part 19B and does not allow transmission nor reception of signals and electric power at the connecting part 19B. In addition, joiners for providing electrical connection between the drain circuit boards 16A and 16B are disposed between the same, and interconnecting layers for transmitting signals to the interconnecting layers of the drain circuit board 16B are formed over the drain circuit board 16A. Accordingly, signals outputted to the drain circuit board 16B from the control board 10 pass through the connecting part 19A, the drain circuit board 16A and the joiners, and are inputted to the drain driving circuits 6 which correspond to the drain circuit board 16B.

In the above-described embodiment, the two drain circuit boards 16A and 16B are connected to the drain driving circuits 6, and the connecting portions 19A and 19B of the respective drain circuit boards 16A and 16B which are connected to the control board 10 are formed on the respective two drain circuit boards 16A and 16B in such a manner that the connecting portions 19A and 19B are respectively located on the same sides of the drain circuit boards 16A and 16B (on the left sides of the drain circuit boards 16A and 16B as viewed in FIG. 1).

Figure 9:
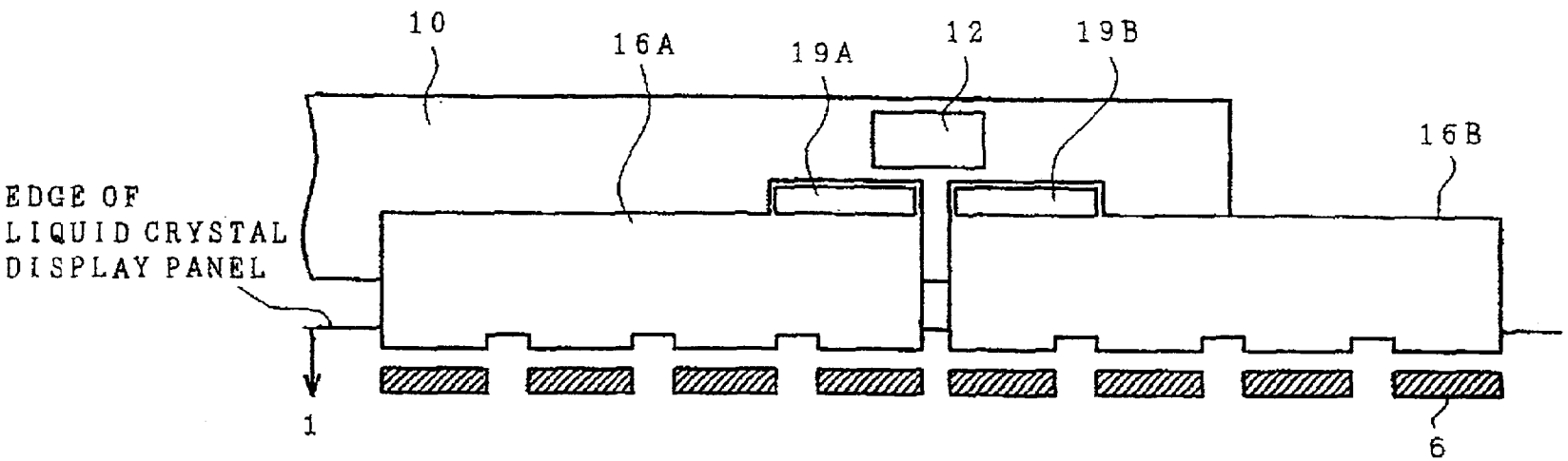
FIG. 9 is an explanatory view showing another embodiment of the liquid crystal display device according to the present invention.

However, needless to say, the drain circuit boards 16A and 16B may be constructed in such a manner that, as shown in FIG. 9, the respective connecting portions 19A and 19B are arranged adjacently to each other (along the longitudinal direction of the drain circuit boards 16A and 16B).

In this case, the control circuit 12 is arranged between the connecting portions 19A and 19B and the output from the control circuit 12 is supplied to the drain circuit boards 16A and 16B via the respective connecting portions 19A and 19B, whereby the distance between the control circuit 12 and the video signal line 4 located at the most distant position from the control circuit 12 is reduced to a great extent.

This structure makes it possible to reduce the occurrence of the waveform distortion of a video signal to be supplied to the video signal line 4 which is located at the most distant position from the control circuit 12 as well as the waveform distortion of a video signal to be supplied to the video signal line or lines 4 near the most distant video signal line 4.

Figure 11A:
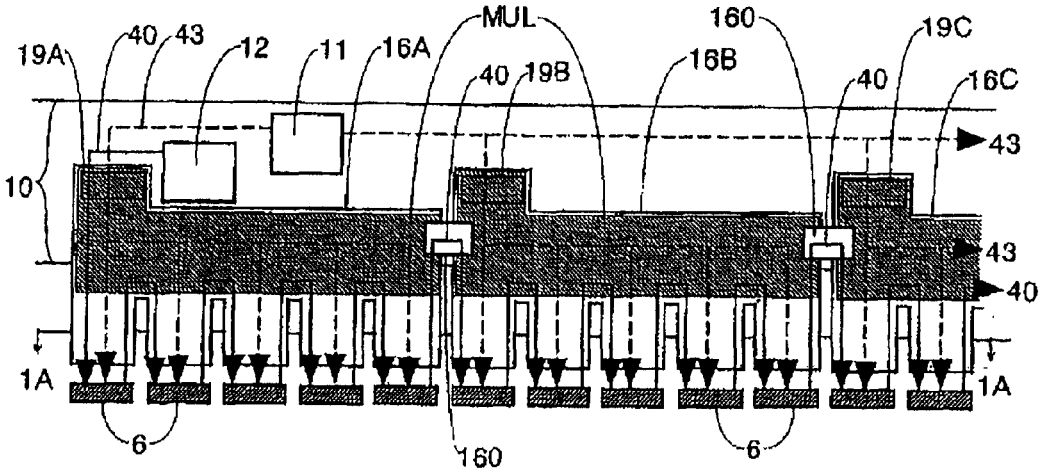
FIGS. 11A, 11B, and 11C are plan views showing the variations of the flexible wiring boards according to the present invention being utilized for the printed drain circuit board of the liquid crystal display device.
Figure 11B:
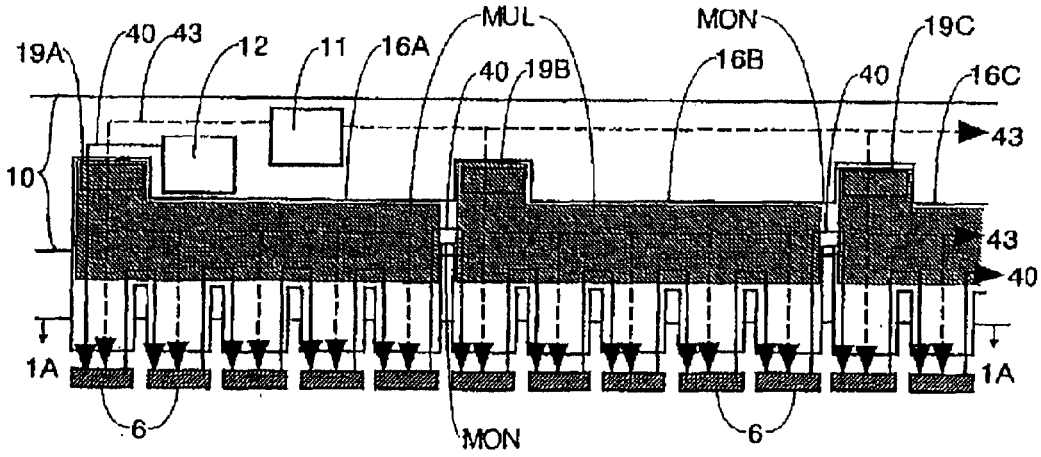
Figure 11C:
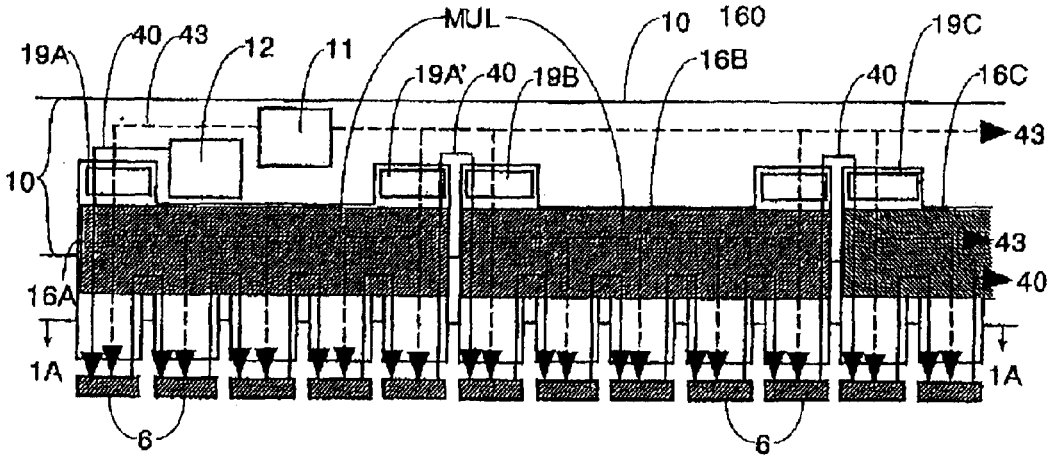

Further variations of the flexible wiring boards being utilized for the liquid crystal display device according to the present invention are shown in FIGS. 11A, 11B, and 11C.

For both the gate driving circuits 5 and the drain driving circuits 6, the carry signal (the enable signal) 30, 40 should be transmitted between the driving circuits sequentially. Each of the variations in FIGS. 11A, 11B, and 11C has a suitable structure for reducing lengths of signal paths, esp. between the flexible wiring boards 16A, 16B, 16C, or so on. Each of these variation also reflects an area of the flexible wiring board which should be formed as the aforementioned Multi-Layered Section MUL.

As mentioned previously, the flexible wiring boards 16A, 16B, 16C juxtaposed along the matrix substrate 1A shown in FIG. 11A are separated from each other to reduce the thermal expansions. However, as the carry signal 40 being outputted from one drain driving circuit 6 facing the right-end of the flexible wiring board 16A has to be transmitted backward to the connecting portion 19A, to pass through the printed circuit board 10, and to be inputted to another drain driving circuit 6 (adjacent to the one drain driving circuit 6) facing the left-end of the flexible wiring board 16B. Such a long signal path may deform the signal wave form of the carry signal 40 on the way to the drain driving circuits 6 corresponding to the flexible wiring board at a next stage. For preventing this possible problem, joint members 160 are provided between the flexible wiring boards 16A and 16B and between the flexible wiring boards 16B and 16C. Both of the joint members 160 have a signal path for transmitting the carry signal 40 therethrough. The signals other than the carry signal 40 may be transmitted through the joint members. However, the thickness of the joint members 160 should take priority to absorb both thermal expansions of the flexible wiring, boards being connected thereby. While thermal expansion appears regardless of the thickness of the flexible circuit board, the thermal expansion is reduced by dividing the flexible circuit board by the member being thinner than the flexible circuit board. Thus, the joint member should be thinner than the portion of the flexible circuit board to which the joint member 160 is connected. For this purpose, reducing a number of conductor layers in the joint member 160 in contrast to that in the portion is recommended, and more preferably, the joint member 160 should be formed of the aforementioned mono-layered structure.

The variation shown in FIG. 11B is a modification of the flexible wiring board of FIG. 2 on the same basis as that of FIG. 11A. The flexible wiring boards 16A, 16B, and 16C are combined by portions narrowed by the slits (called narrowed portions, hereinafter), and the carry signal 40 is transmitted between the flexible wiring boards adjacent to one another through the portion. Both of the slits defining the narrowed portions get into the width direction of the flexible wiring board longer than the other slits dividing the aforementioned protruding portions. It is apparent from the multilayered section, that each of the flexible wiring boards are separated by the mono-layered section MON of the narrowed portion. According to this structural feature, the thermal expansions appearing at the respective flexible wiring boards are absorbed by the narrowed portion. Although the slit defining the narrowed portion is shorter than the other slits dividing the protruding portions in the width direction of the flexible wiring board or the narrowed portion has the aforementioned multi-layered structure thinner than that of the flexible wiring board, a similar advantage to that of the structure of FIG. 11B can be obtained. The combined flexible wiring board of FIG. 11B has one of the best structures for reducing influence of the thermal expansions of the respective flexible wiring boards upon the combined structure thereof.

The structure of FIG. 11C is different from those of FIGS. 11A and 11B. The flexible wiring boards 16A, 16B, and 16C in FIG. 11C are not connected to one another, but each of the flexible wiring boards has a pair of the connecting portion. As FIG. 11C shows, one of the flexible wiring boards 16A has a first connecting portion 19A at the left side thereof and a second connecting portion 19A' at the right side thereof. According to this structure, the carry signal 40 being outputted from one drain driving circuit 6 facing the right-end of the flexible wiring board 16A is transmitted through the second connecting portion 19A' of the flexible wiring board 16A, the printed circuit board 10, and the first connecting portion 19B of the flexible wiring board 16B, to be inputted to another drain driving circuit 6 (adjacent to the one drain driving circuit 6) facing the left-end of the flexible wiring board 16B. Although the path length of the carry signal 40 between the flexible wiring boards adjacent to one another in FIG. 11C becomes longer than those in FIGS. 11A and 11B, the similar advantage to those for the structures of FIG. 11A and 11B is obtained. The structure of FIG. 11C has further advantage to prevent electric power or signal intensity other than the carry signal from becoming weaker in accordance with a distance from the connecting portion. In FIG. 11C, the electric power supplying line for the drain driving circuits 43 is extending from the source circuit 11 into the flexible wiring board 16A through not only the connecting portion 19A but also the connecting portion 19A'. According to this structure, the voltage drop of the electric power for the drain driving circuits 43 inside the flexible wiring board is prevented.

In the above description of each of the embodiments, reference has been made to an improvement in the drain circuit boards 16A and 16B for the drain driving circuits 6. However, needless to say, the present invention can also be applied to the gate circuit board 15 for the gate driving circuits 5.

This is because the gate circuit board 15 for the gate driving circuits 5 and the drain circuit boards 16A and 16B for the drain driving circuits 6 differ from each other only in the kind of signal to be supplied and are completely the same in mechanical structure, and also because a similar problem occurs if the size of the liquid crystal display panel 1 becomes far larger and the side of the liquid crystal display panel 1 that is adjacent to the gate driving circuits 5 becomes far longer.

In the above description of each of the embodiments, reference has been made to a liquid crystal display device of the so-called lateral electric field type. However, needless to say, the present invention can also be applied to a so-called vertical electric field type.

The vertical electric field type of liquid crystal display device which has been used herein represents a liquid crystal display device having a structure in which transparent electrodes are respectively formed over the liquid-crystal-side surfaces of transparent substrates which are disposed to oppose each other across a liquid crystal and an electric field is produced in the liquid crystal by the potential difference between the electrodes.

As long as, in such a liquid crystal display device, driving circuits mounted on its liquid crystal display panel, flexible wiring boards, printed circuit boards and the like have structures similar to those of the previously described corresponding ones, the present invention can be applied to the liquid crystal display device without any modification.

As is apparent from the foregoing description, in accordance with the liquid crystal display device according to the present invention, in spite of an increase in the size of a liquid crystal display panel, it is possible to prevent the defective connection of a flexible wiring board to a transparent substrate of the liquid crystal display panel.

In addition, in spite of an increase in the size of the liquid crystal display panel, it is possible to prevent waveform distortion from occurring in a signal on a signal line which lies on one side of the liquid crystal display panel in the direction of juxtaposition of signal lines.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

[1. A liquid crystal display device, comprising:

a liquid crystal display panel having, a pair of substrates arranged to oppose each other, a liquid crystal layer interposed between the pair of substrates, a plurality of pixels being formed along the liquid crystal layer;

a plurality of driving circuits for supplying signals to the pixels and being juxtaposed along one of edges of the liquid crystal display panel, the plurality of driving circuits being arranged adjacent one another and divided into a plurality of driving circuits groups having plural driving circuits along the one of the edges of the liquid crystal panel;

a printed circuit board having a control circuit mounted thereon which controls the plurality of driving circuits; and a plurality of flexible wiring boards being juxtaposed along a direction in which the plurality of driving circuits are juxtaposed, a respective one of the plurality of flexible wiring boards being provided for a respective one of the plurality of driving circuits groups, each of the plurality of flexible wiring boards having a connecting portion to be connected to the printed circuit board and protruded portions provided in correspondence with respective driving circuits of a respective driving circuits group, the protruded portions being spaced from one another and protruding toward the one of the edges of the liquid crystal display panel and having respective ends mounted on one of the pair of substrates at the one of the edges of the liquid crystal display panel, wherein each of the plurality of flexible wiring boards receives a control signal from the control circuit through the connecting portion thereof and inputs the control signal sequentially to respective input sides of the respective driving circuits of the respective one of the driving circuit groups corresponding thereto, and each of the protruded portions thereof having at least one signal path thereof inputting the control signal to the input side of the driving circuits of the respective one of the driving circuits groups.]

[2. A liquid crystal display device according to claim 1, wherein the plurality of driving circuits are ICs.]

[3. A liquid crystal display device according to claim 1, wherein the control signal is an enable signal sent from the control circuit to the plurality of driving circuits successively along the one of the edges of the liquid crystal panel through each of the plurality of flexible wiring boards and controls video signal acquisition by the respective driving circuits performed sequentially along the one of the edges of the liquid crystal panel.]

[4. A liquid crystal display device according to claim 1, wherein the printed circuit board is constructed to sequentially supply the control signal from said control circuit between said flexible wiring boards which are arranged adjacent to one another.]

[5. A liquid crystal display device according to claim 1, wherein a pair of the connecting terminals of a pair of the plurality of flexible wiring boards are arranged at respective sides of the pair of the plurality of flexible wiring boards which are adjacent to one another.]

[6. A liquid crystal display device according to claim 5, wherein the control circuit confronts a region between the pair of the connecting terminals of the pair of the plurality of flexible wiring boards.]

[7. A liquid crystal display device according to claim 1, wherein the control signal being supplied to the driving circuits corresponding to the one of the plurality of flexible wiring boards is a starting signal, and controls video signal acquisition of each of the driving circuits corresponding thereto sequentially along the one of the edges of the liquid crystal display panel as transferred between the respective driving circuits corresponding thereto.]

[8. A liquid crystal display device according to claim 1, wherein at least one of the plurality of flexible wiring boards has another connecting portion outputting the control signal outputted from one of the driving circuits corresponding thereto.]

[9. A liquid crystal display device according to claim 1, wherein each of the plurality of the pixels has a switching element, and the plurality of driving circuits are mounted on the one of the pair of substrates over which a plurality of video signal lines being connected to at least one of the switching elements are formed.]

[10. A liquid crystal display device according to claim 9, wherein the plurality of video signal lines are divided into groups in accordance with the driving circuits groups, and each of the groups includes a plurality of video signal lines adjacent to each other.]

[11. A liquid crystal display device, comprising:

a liquid crystal display panel having, a pair of substrates arranged to oppose each other, a liquid crystal layer interposed between the pair of substrates, a plurality of pixels being formed along the liquid crystal layer;

a plurality of driving circuits for supplying signals to the pixels and being juxtaposed along one of edges of the liquid crystal display panel, the plurality of driving circuits being arranged adjacent one another and divided into a plurality of driving circuits groups having plural driving circuits along the one of the edges of the liquid crystal panel;

a printed circuit board having a control circuit mounted thereon which controls the plurality of driving circuits; and a flexible wiring board, which is arranged to extend along a direction in which the plurality of driving circuits are juxtaposed, consisting of a plurality of sections thereof provided in correspondence with the driving circuits groups and arranged in an extension direction thereof, each of the sections having a connecting portion to be connected to the printed circuit board, and having protruded portions thereof protruded toward the one of the edges of the liquid crystal display panel in correspondence with the respective driving circuits belonging to the one of the driving circuit groups and having respective ends mounted on one of the pair of substrates at the one of the edges of the liquid crystal display panel, the protruded portions being spaced from each other at the ends thereof, wherein a flexible wiring board receives a control signal from the control circuit through one of the connecting portions of the sections thereof, each of the protruded portions corresponds to one of the driving circuits has at least one signal path for the control signal to be connected to an input side of the driving circuit corresponding thereto, each region of the flexible wiring board between each pair of the sections which are adjacent to one another along the extension direction thereof is narrower than the rest thereof, and the control signal is inputted to each of the plurality of driving circuits sequentially along the one of the edges of the liquid crystal display panel and is transferred through each region between the sections of the flexible wiring board.]

[12. A liquid crystal display device according to claim 11, wherein the flexible wiring board has multi-layered regions in the respective section thereof where a plurality of the conductive layers are stacked on each other, and the protruded portions and the each region between the sections are thinner than the multi-layered regions.]

[13. A liquid crystal display device according to claim 1, wherein the flexible wiring board has a multi-layered region where a plurality of the conductive layers being stacked on each other, and the protruded portions thereof are thinner than the multi-layered regions.]

[14. A liquid crystal display device according to claim 1, wherein the plurality of flexible wiring boards consists of a pair of flexible wiring boards extended and juxtaposed along the one of the edges of the liquid crystal display panel.]

[15. A liquid crystal display device according to claim 11, wherein the flexible wiring board comprises a plurality of flexible wiring boards juxtaposed along the one of the edges of the liquid crystal display panel for the respective section thereof, and a pair of the plurality of flexible wiring boards adjacent to one another are connected by a joint member provided at the region therebetween.]

[16. A liquid crystal display device according to claim 11, wherein the plurality of driving circuits are divided into a pair of driving circuits groups each including a plurality of driving circuits adjacent to each other along the one of the edges of the liquid crystal display panel, and the flexible wiring board consists of a pair of the sections thereof provided in correspondence with the pair of driving circuits groups, respectively.]

*17. A display device comprising:*

*a first substrate comprising video signal lines for supplying a video signal to pixels, and scanning signal lines for supplying a scanning signal to the pixels;*

*a first board comprising a control circuit;*

*a plurality of driving circuits comprising a plurality of first driving circuits and a plurality of second driving circuits, each of the first and second driving circuit supplying the video signal to the video signal lines;*

*a second board for supplying an output from the control circuit to the plurality of first driving circuits, the second board being arranged between the first substrate and the first board;*

*a third board for supplying an output from the control circuit to the plurality of second driving circuits, the third board being arranged between the first substrate and the first board;*

*each pixel comprising:*

*a pixel electrode; and*

*a thin film transistor for controlling application of the video signal to the pixel electrode by the scanning signal;*

*wherein the output from the control circuit is supplied from a first area on the first board to a third area on the second board;*

*wherein the output from the control circuit is supplied from a second area on the first board to a fourth area on the third board;*

*wherein the third area is arranged adjacent one side of the second board, and the one side of the second board is arranged adjacent to the third board;*

*wherein the fourth area is arranged adjacent one side of the third board, and the one side of the third board is arranged adjacent to the second board,*

*wherein the first area on the first board overlaps with the third area on the second board;*

*wherein the second area on the first board overlaps with the fourth area on the third board;*

*wherein the output from the control circuit to the plurality of the first driving circuits is supplied through the second board independently of the third board;*

*wherein the output from the control circuit to the plurality of the second driving circuits is supplied through the third board independently of the second board; and*

*wherein the control circuit is arranged to overlap with the first area and the second area on the first board.*

*18. A display device according to claim 17, wherein the first substrate has long sides and short sides, and the second board and the third board are arranged between one long side of the first substrate and the first board.*

*19. A display device according to claim 17, further comprising a second substrate, wherein the second substrate and the first substrate sandwich a liquid crystal layer, and a transparent electrode is arranged on an inside of the second substrate.*

*20. A display device according to claim 18, further comprising a second substrate, wherein the second substrate and the first substrate sandwich the liquid crystal layer, and a transparent electrode is arranged on the inside of the second substrate.*

*21. A display device comprising:*

*a first substrate comprising a video signal lines for supplying a video signal for pixels, and a scanning signal lines for supplying a scanning signal for pixels;*

*a first board comprising a control circuit;*

*a plurality of driving circuits comprising a plurality of left driving circuits and a plurality of right driving circuits, each of left and right driving circuits being arranged horizontally, each of the left and right the driving circuits supplying the video signal to the video signal lines;*

*a second board for supplying an output from the control circuit to the plurality of left driving circuits, the second board being arranged between the first substrate and the first board;*

*a third board for supplying an output from the control circuit to the plurality of right driving circuits, the third board being arranged between the first substrate and the first board;*

*each pixel comprising:*

*a pixel electrode; and*

*a thin film transistor for controlling application of the video signal to the pixel electrode by the scanning signal;*

*wherein the output from the control circuit is supplied from a first area on the first board to a third area on the second board;*

*wherein the output from the control circuit is supplied from a second area on the first board to a fourth area on the third board;*

*wherein the third area is arranged adjacent one side of the second board, and the one side of the second board is arranged adjacent to the third board;*

*wherein the fourth area is arranged adjacent one side of the third board, and the one side of the third board is arranged adjacent to the second board;*

*wherein the first area on the first board overlaps with the third area on the second board;*

*wherein the second area on the first board overlaps with to the fourth area on the third board;*

*wherein the output from the control circuit to the plurality of left driving circuits is supplied through the second board independently of the third board;*

*wherein the output from the control circuit to the plurality of right driving circuits is supplied through the third board independent of the second board; and*

*wherein the control circuit is arranged to overlap with the first area and the second area on the first board.*

*22. A display device according to claim 21, wherein the first substrate has long sides and short sides, and the second board and the third board are arranged between one long side of the first substrate and the first board.*

*23. A display device according to claim 21, further comprising a second substrate, wherein the second substrate and the first substrate sandwich the liquid crystal layer, and a transparent electrode is arranged on an inside of the second substrate.*

*24. A display device according to claim 22, further comprising a second substrate, wherein the second substrate and the first substrate sandwich the liquid crystal layer, and a transparent electrode is arranged on an inside of the second substrate.*

*25. A display device comprising:*

*a first substrate comprising video signal lines for supplying a video signal for pixels, and scanning signal lines for supplying a scanning signal for pixels;*

*a first board comprising a control circuit;*

*a plurality of driving circuit comprising a plurality of first half driving circuits and a plurality of second half driving circuits, each of the first and second half driving circuits supplying the video signal to the video signal lines;*

*a second board for supplying an output from the control circuit to the plurality of first half driving circuits, the second board being arranged between the first substrate and the first board;*

*a third board for supplying an output from the control circuit to the plurality of second half driving circuits, the third board being arranged between the first substrate and the first board;*

*each the pixel comprising:*

*a pixel electrode; and*

*a thin film transistor for controlling application of the video signal to the pixel electrode by the scanning signal;*

*wherein the output from the control circuit is supplied from a first area on the first board to a third area on the second board;*

*wherein the output from the control circuit is supplied from a second area on the first board to a fourth area on the third board;*

*wherein the third area is arranged adjacent one side of the second board, and the one side of the second board is arranged adjacent to the third board;*

*wherein the fourth area is arranged adjacent one side of the third board, and the one side of the third board is arranged adjacent to the second board;*

*wherein the first area on the first board overlaps with the third area on the second board;*

*wherein the second area on the first board overlaps with the fourth area on the third board;*

*wherein the output from the control circuit to the plurality of first half driving circuits is supplied through the second board independently of the third board;*

*wherein the output from the control circuit to the plurality of second half driving circuits is supplied through the third board independent of the second board; and*

*wherein the control circuit is arranged to overlap with the first area and the second area on the first board.*

*26. A display device according to claim 25, wherein the second board is arranged to a left of the third board, and each of the plurality of driving circuits is arranged horizontally, the plurality of first half driving circuits being arranged to a left side of the plurality of second half driving circuits.*

*27. A display device according to claim 25, wherein the first substrate has long sides and short sides, and the second board and the third board are arranged between one long side of the first substrate and the first board.*

*28. A display device according to claim 26, wherein the first substrate has long sides and short sides, the long sides being arranged horizontally and the second board and the third board is arranged between one long side of the first substrate and the first board.*

*29. A display device according to claim 25, further comprising a second substrate, wherein the second substrate and the first substrate sandwich the liquid crystal layer, and a transparent electrode is arranged on an inside of the second substrate.*

*30. A display device according to claim 26, further comprising a second substrate, wherein the second substrate and the first substrate sandwich the liquid crystal layer, and a transparent electrode is arranged on an inside of the second substrate.*

*31. A display device according to claim 27, further comprising a second substrate, wherein the second substrate and the first substrate sandwich the liquid crystal layer, and a transparent electrode is arranged on an inside of the second substrate.*

*32. A display device according to claim 28, further comprising a second substrate, wherein the second substrate and the first substrate sandwich the liquid crystal layer, and a transparent electrode is arranged on an inside of the second substrate.*

* * * * *